US008352581B2

(12) United States Patent
Ishiguro

(10) Patent No.: US 8,352,581 B2
(45) Date of Patent: Jan. 8, 2013

(54) DATA TRANSMISSION APPARATUS INDICATING TRANSMISSION STATUS, TRANSMISSION CONTROL METHOD INDICATING TRANSMISSION STATUS, AND PROGRAM THEREOF

(75) Inventor: Makiko Ishiguro, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 328 days.

(21) Appl. No.: 12/495,664

(22) Filed: Jun. 30, 2009

(65) Prior Publication Data

US 2010/0005159 A1 Jan. 7, 2010

(30) Foreign Application Priority Data

Jul. 3, 2008 (JP) ................................. 2008-175008

(51) Int. Cl.
*G06F 15/177* (2006.01)
(52) U.S. Cl. ......................... 709/221; 709/217; 709/219
(58) Field of Classification Search .................. 709/217, 709/219, 221
See application file for complete search history.

(56) References Cited

U.S. PATENT DOCUMENTS

| | | | | |
|---|---|---|---|---|
| 6,778,289 | B1 * | 8/2004 | Iwata | 358/1.15 |
| 2008/0068647 | A1 * | 3/2008 | Isobe et al. | 358/1.15 |
| 2008/0106604 | A1 * | 5/2008 | Kojima | 348/207.2 |
| 2008/0155501 | A1 * | 6/2008 | Ravikumar et al. | 717/110 |
| 2008/0229210 | A1 * | 9/2008 | Bamba | 715/740 |
| 2008/0301261 | A1 * | 12/2008 | Nakazawa | 709/219 |
| 2008/0313677 | A1 * | 12/2008 | Lee | 725/56 |
| 2009/0021767 | A1 * | 1/2009 | Fujimaki | 358/1.15 |
| 2010/0039659 | A1 * | 2/2010 | Suzuki | 358/1.14 |

FOREIGN PATENT DOCUMENTS

JP 2007-48009 2/2007

* cited by examiner

*Primary Examiner* — Mohamed Wasel
(74) *Attorney, Agent, or Firm* — Canon USA Inc. IP Division

(57) ABSTRACT

A data transmission apparatus which transmits data includes an acquisition unit configured to acquire information including a transmission destination of the data from an information providing apparatus on a network, a transmission unit configured to transmit the data to the transmission destination based on the information acquired by the acquisition unit, and a request unit configured to request the information providing apparatus to update the information during transmission of the data by the transmission unit.

18 Claims, 10 Drawing Sheets

FIG.3A

```
301 <ticketName>Yamada_BUSINESS TRIP SETTLEMENT</ticketName>
302 <ticketID>0001002</ticketID>
303 <scanSetting>
        <color>color</color> 304
        <format>jpg</format> 305
    </scanSetting>
306 <contents>
        <item name=ACCOMMODATION EXPENSE data_max=1 /> 307
        <item name=TRANSPORTATION EXPENSE data_max=unlimited /> 308
    </contents>
309 <storage>http://DB/Yamada/BUSINESS TRIP EXPENSE/2007_4_21</storage>
```

FIG.3B

```
301 <ticketName>Yamada_BUSINESS TRIP SETTLEMENT</ticketName>
302 <ticketID>0001002</ticketID>
303 <scanSetting>
        <color>color</color> 304
        <format>jpg</format> 305
    </scanSetting>
306 <contents>
        <item name=ACCOMMODATION EXPENSE data_max=1> 307
            <filename date=2007/5/12>ACCOMMODATION EXPENSE.jpg</filename> 401
        </item>
        <item name=TRANSPORTATION EXPENSE data_max=unlimited /> 308
    </contents>
309 <storage>http://DB/Yamada/BUSINESS TRIP EXPENSE/2007_4_21</storage>
```

FIG.4A

```
301 <ticketName>Yamada_BUSINESS TRIP SETTLEMENT</ticketName>
302 <ticketID>0001002</ticketID>
303 <scanSetting>
        <color>color</color>  304
        <format>jpg</format>  305
    </scanSetting>
306 <contents>
        <item name=ACCOMMODATION EXPENSE data_max=1>  307
            <filename date=2007/5/12>ACCOMMODATION EXPENSE.jpg</filename>  401
        </item>
        <item name=TRANSPORTATION EXPENSE data_max=unlimited>  308
            <filename date=2007/5/12>TRANSPORTATION EXPENSE 0001.jpg</filename>  501
            <filename date=2007/5/14>TRANSPORTATION EXPENSE 0002.jpg</filename>  502
        </item>
    </contents>
309 <storage>http://DB/Yamada/BUSINESS TRIP EXPENSE/2007_4_21</storage>
```

FIG.4B

```
301 <ticketName>Yamada_BUSINESS TRIP SETTLEMENT</ticketName>
302 <ticketID>0001002</ticketID>
303 <scanSetting>
        <color>color</color>  304
        <format>jpg</format>  305
    </scanSetting>
306 <contents>
        <item name=ACCOMMODATION EXPENSE data_max=1>  307
            <filename date=2007/5/12>ACCOMMODATION EXPENSE.jpg</filename>  401
        </item>
        <item name=TRANSPORTATION EXPENSE data_max=unlimited>  308
            <filename date=2007/5/12>TRANSPORTATION EXPENSE 0001.jpg</filename>  501
601         <filename date=2007/5/16>TRANSPORTATION EXPENSE 0002.jpg</filename>
            <filename date=2007/5/16>TRANSPORTATION EXPENSE 0003.jpg</filename>  602
        </item>
    </contents>
309 <storage>http://DB/Yamada/BUSINESS TRIP EXPENSE/2007_4_21</storage>
```

FIG.9A

```
301 <ticketName>Yamada_BUSINESS TRIP SETTLEMENT</ticketName>
302 <ticketID>0001002</ticketID>
303 <scanSetting>
        <color>color</color> 304
        <format>jpg</format> 305
    </scanSetting>
306 <contents>
        <item name=ACCOMMODATION EXPENSE data_max=1> 307
            <filename date=2007/5/12>ACCOMMODATION EXPENSE.jpg</filename> 401
        </item>
        <item name=TRANSPORTATION EXPENSE data_max=unlimited> 308
            <filename date=2007/5/12>TRANSPORTATION EXPENSE 0001.jpg</filename> 501
            <filename date=2007/5/16>TRANSPORTATION EXPENSE 0002.jpg</filename> 601
            <filename date=2007/5/16>TRANSPORTATION EXPENSE 0003.jpg</filename> 602
        </item>
    </contents>
309 <storage>http://DB/Yamada/BUSINESS TRIP EXPENSE/2007_4_21</storage>
801 <mode approverID=10988>SETTLEMENT PROCESSING PERSON</mode>
```

FIG.9B

```
301 <ticketName>Yamada_BUSINESS TRIP SETTLEMENT</ticketName>
302 <ticketID>0001002</ticketID>
303 <scanSetting>
        <color>color</color> 304
        <format>jpg</format> 305
    </scanSetting>
306 <contents>
        <item name=ACCOMMODATION EXPENSE data_max=1> 307
            <filename date=2007/5/12>ACCOMMODATION EXPENSE.jpg</filename> 401
        </item>
        <item name=TRANSPORTATION EXPENSE data_max=unlimited> 308
            <filename date=2007/5/12>TRANSPORTATION EXPENSE 0001.jpg</filename> 501
            <filename date=2007/5/16>TRANSPORTATION EXPENSE 0002.jpg</filename> 601
            <filename date=2007/5/16>TRANSPORTATION EXPENSE 0003.jpg</filename> 602
        </item>
    </contents>
309 <storage>http://DB/Yamada/BUSINESS TRIP EXPENSE/2007_4_21</storage>
901 <mode approverID=10000>10988</mode>
        <comment>ACCOMMODATION EXPENSE INFORMATION IS INSUFFICIENT.</comment> 902
```

DATA TRANSMISSION APPARATUS INDICATING TRANSMISSION STATUS, TRANSMISSION CONTROL METHOD INDICATING TRANSMISSION STATUS, AND PROGRAM THEREOF

BACKGROUND OF THE INVENTION

1. Field of the Invention

The present invention relates to a data transmission apparatus, a transmission control method, and a program.

2. Description of the Related Art

Conventionally, there is a service for transmitting data scanned using a digital multifunction peripheral (MFP) During transmission, one job is issued per transmission operation, such as a business trip settlement and the like. Further, a user can inquire about, display, and browse his/her own data stored in a transmission destination. In addition, there is a technique which can easily realize creation and updating of an instruction in which an operation to be performed is described (e.g., Japanese Patent Application Laid-Open No. 2007-48009).

However, since only one job is issued per transmission operation, when there is a plurality of pieces of data which a user wishes to transmit, the user has to transmit the plurality of pieces of data all at once. However, sometimes it is convenient for the user to transmit the plurality of pieces of data by dividing into transmissions over several days. For example, for business trip settlement of a business trip lasting three days, it is convenient to provisionally transmit a first day's transportation expenses on that day. One way of doing this is to separate the job into jobs which are issued daily, but this makes the processing complicated.

SUMMARY OF THE INVENTION

The present invention is directed to updating information used in data transmission to allow a user to comprehend a fact that data has been transmitted by using the updated information.

According to an aspect of the present invention, a data transmission apparatus which transmits data includes an acquisition unit configured to acquire information including a transmission destination of the data from an information providing apparatus on a network, a transmission unit configured to transmit the data to the transmission destination based on the information acquired by the acquisition unit, and a request unit configured to request the information providing apparatus to update the information during transmission of the data by the transmission unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A and 3B illustrate an example of a scan ticket acquired from a ticket server and an example of a scan ticket edited by the image processing apparatus.

FIGS. 4A and 4B illustrate an example of a scan ticket acquired from the ticket server and an example of a scan ticket edited by the image processing apparatus.

FIGS. 9A and 9B illustrate an example of a scan ticket in which information about a last processing person and a next processing person is additionally described, and an example of a scan ticket in which information about a last processing person and a next processing person is changed.

DETAILED DESCRIPTION OF THE EMBODIMENTS

Various exemplary embodiments, features, and aspects of the invention will be described in detail below with reference to the drawings.

Figure 1:
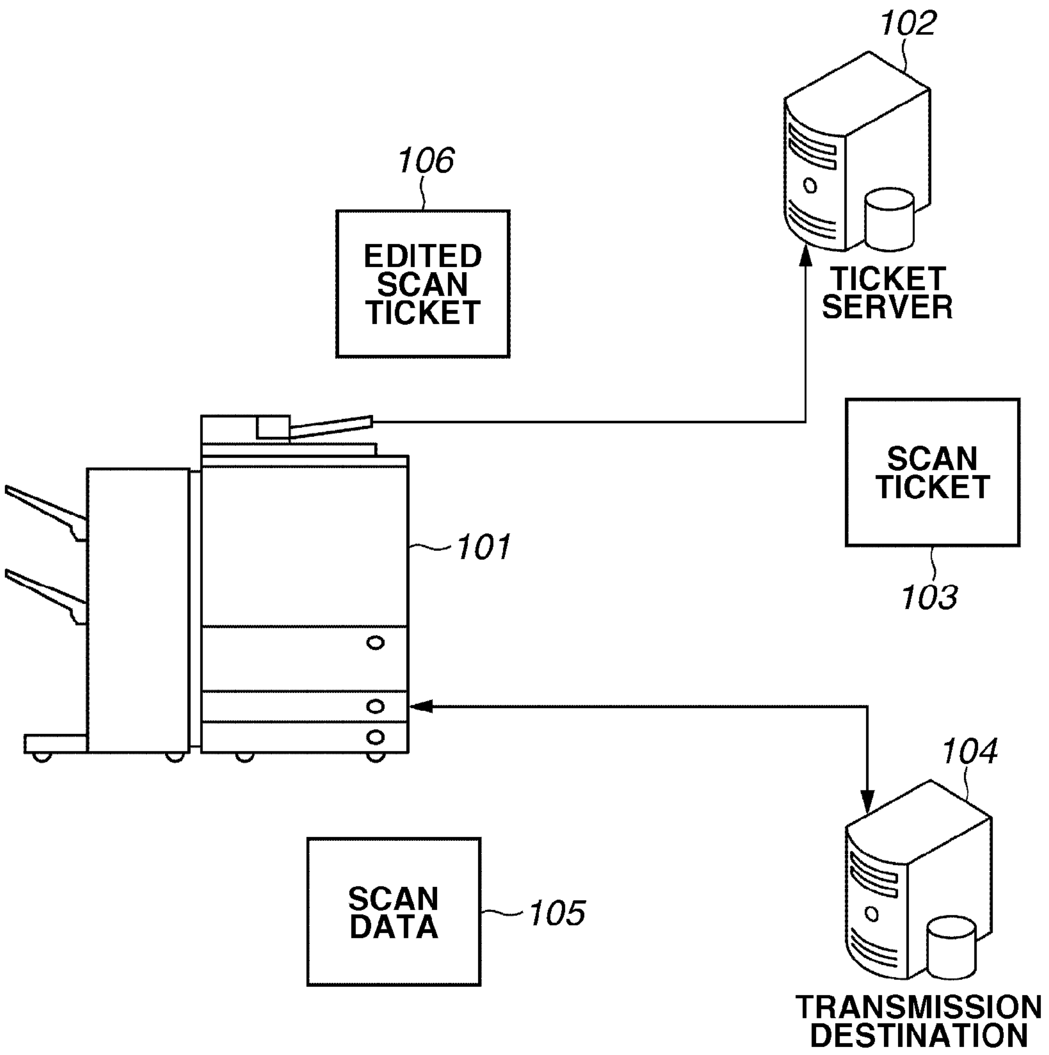
FIG. 1 illustrates an overall system configuration of an exemplary embodiment of the present invention.

First, a first exemplary embodiment of the present invention will be described. FIG. 1 illustrates an overall system configuration of the first exemplary embodiment of the present invention.

An image processing apparatus 101 functions as a data transmission apparatus which communicates with a below-described ticket server 102 and a transmission destination 104 via a network (not illustrated). The ticket server 102 stores and manages a below-described scan ticket for each user. A scan ticket 103 is stored in the ticket server 102. In the scan ticket 103, information for storing a scanned image (scan ticket) is described. The below-described scan data transmission destination 104 includes, for example, a database (DB) and the like which stores transmitted data. Scan data 105 is generated by scan processing of the image processing apparatus 101. The scan data 105 is edited by the image processing apparatus 101 to generate an edited scan ticket 106. The scan ticket 103 and edited scan ticket 106 are pieces of data processing information.

Figure 2:
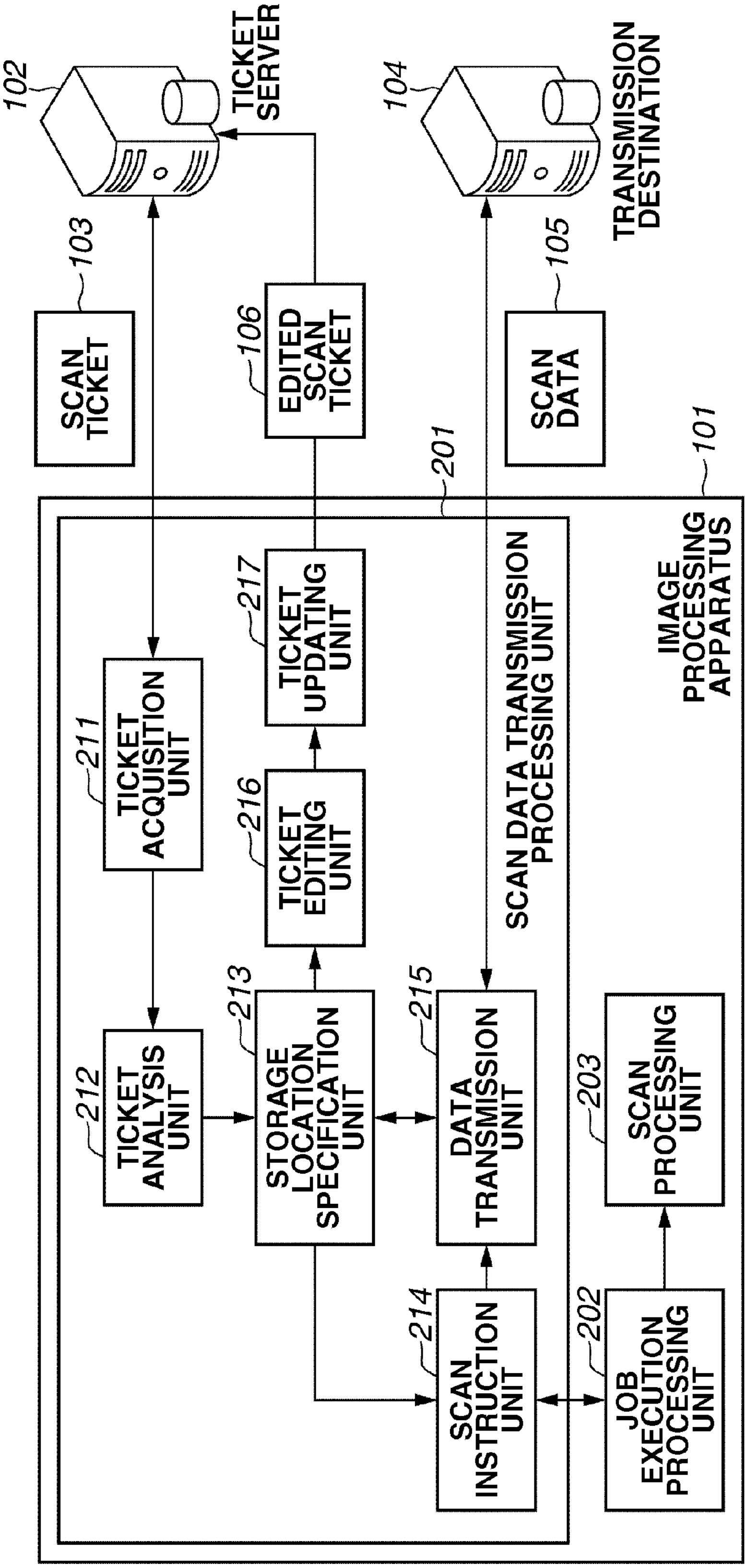
FIG. 2 is a block diagram illustrating a functional configuration of an image processing apparatus.

FIG. 2 is a block diagram illustrating a functional configuration of the image processing apparatus 101. As illustrated in FIG. 2, the image processing apparatus 101 is configured with a scan data transmission processing unit 201, a job execution processing unit 202, and a scan processing unit 203.

The scan data transmission processing unit 201 receives the scan ticket 103 from the ticket server 102, and stores the scanned scan data 105 in the transmission destination 104. Further, the scan data transmission processing unit 201 edits the scan ticket 103 as required, transmits the edited scan ticket 106 to the ticket server 102, and requests the ticket server 102 to update the scan ticket 103. In the edited scan ticket 106, transmission destination information and scan setting information, such as paper size, resolution and the like, are described. The scan data transmission processing unit 201 will be described in more detail below.

The job execution processing unit 202 receives an instruction from the scan data transmission processing unit 201 and causes the scan processing unit 203 to execute a job. The scan processing unit 203 reads information recorded on a paper medium and executes scan processing for computerizing the read information.

In the scan data transmission processing unit 201, a ticket acquisition unit 211 acquires the scan ticket 103 of a user from the ticket server 102. A ticket analysis unit 212 analyzes contents of the scan ticket 103 transferred from the ticket acquisition unit 211. A storage location specification unit 213 determines a filename based on an analyzed result of the scan ticket 103 transferred from the ticket analysis unit 212 and an update and addition instruction from the user. Further, the storage location specification unit 213 transfers the scan setting information to a below-described scan instruction unit 214, and transfers the transmission destination information and the filename to a below-described data transmission unit 215.

The scan instruction unit 214 requests the job execution processing unit 202 to perform scanning based on the scan setting information transferred from the storage location specification unit 213. The data transmission unit 215 stores the scan data 105 transferred from the scan instruction unit 214 in the transmission destination 104 based on the transmission destination information transferred from the storage location specification unit 213. When editing of the scan ticket 103 is requested from the storage location specification unit 213, a ticket editing unit 216 edits the scan ticket 103. A ticket updating unit 217 transmits the edited scan ticket 106 received from the ticket editing unit 216 to the ticket server 102, and requests the ticket server 102 to update the original scan ticket 103.

FIG. 3A illustrates an example of the scan ticket 103 acquired from the ticket server 102. FIG. 3A illustrates an example of the scan ticket 103 when the transmission destination 104 is a business trip settlement DB of the user's company, and the user performed business trip settlement.

The user makes an inquiry to the ticket server 102 about the user's own scan ticket 103 on which business trip settlement processing needs to be performed, and acquires the scan ticket 103. Here, a name 301 of the scan ticket is "Yamada_business trip settlement". A scan ticket identification (ID) 302 is a unique piece of ID information in Yamada_business trip settlement. In scan setting information 303, a setting 304 of color or monochrome, and a designation 305 of an image format is specified. In the example in FIG. 3A, it is described that scanning is performed in color in a joint photographic experts group (JPEG) format.

In the present exemplary embodiment, two items are described in contents 306 of the business trip settlement. An item element 307 is an accommodation expense item which is a business trip settlement item. In the accommodation expense item, it is described that the name is "accommodation expense" (name=accommodation expense), and the maximum number of storage files is one (data_max=1). An item element 308 is a transportation expense item which is a business trip settlement item. In the transportation expense item, it is described that the name is "transportation expense" (name=transportation expense), and there is no upper limit to the maximum number of storage files (data_max=unlimited). In a storage location 309, the storage location is described to a directory name thereof.

FIG. 3B illustrates an example of the edited scan ticket 106 obtained by the image processing apparatus 101 editing the scan ticket 103 of FIG. 3A. FIG. 3B illustrates an example of the edited scan ticket 106 when the user newly stored accommodation expense data. The difference between the scan ticket 103 illustrated in FIG. 3A and the edited scan ticket 106 illustrated in FIG. 3B is the presence of a description 401. The description 401 describes the filename of the accommodation expense data stored in the transmission destination 104, and is additionally described in the accommodation expense item of the item element 307. Further, information about a storage date (date=2007/5/12) is added to the description 401 as an attribute.

FIG. 4A illustrates an example of the scan ticket 103 acquired from the ticket server 102. FIG. 4A illustrates an example in which the scan ticket 103 of FIG. 3B was edited when the user transmitted transportation expense data, and stored in the ticket server 102. The difference between the edited scan ticket 106 illustrated in FIG. 3B and the scan ticket 103 illustrated in FIG. 4A is the presence of filename elements 501 and 502.

In the filename element 501, the filename of the transportation expense data stored in the transmission destination 104 is described. The filename element 501 is added to the transportation expense item of the item element 308. Further, information about a storage date (storage period) is added to the filename element 501 as an attribute (date=2007/5/12). Similarly, in the filename element 502, the filename of the transportation expense data stored in the transmission destination 104 is described, and the filename element 502 is described in the transportation expense item of the item element 308. Further, information about a storage date (storage period) is added to the filename element 502 as an attribute (date=2007/5/14).

FIG. 4B illustrates an example of the edited scan ticket 106 obtained by the image processing apparatus 101 editing the scan ticket 103 of FIG. 4A. FIG. 4B illustrates an example of the edited scan ticket 106 when the user updated and newly added the transportation expense data. The difference between the scan ticket 103 of FIG. 4A and the edited scan ticket 106 of FIG. 4B is the presence of filename elements 601 and 602.

The filename element 601 is a description for when the transportation expense data 0002.jpg (filename element 502) already stored in the transmission destination 104 is updated, and the attribute date is changed (date=2007/5/16). The filename element 602 is a piece of newly added transportation expense data, and is added to the transportation expense item of the item element 308. Further, as an attribute thereof, information about a storage date is added (date=2007/5/16).

FIGS. 5 to 8 are flowcharts illustrating processing flows in the scan data transmission processing unit 201 of the image processing apparatus 101.

Figure 5:
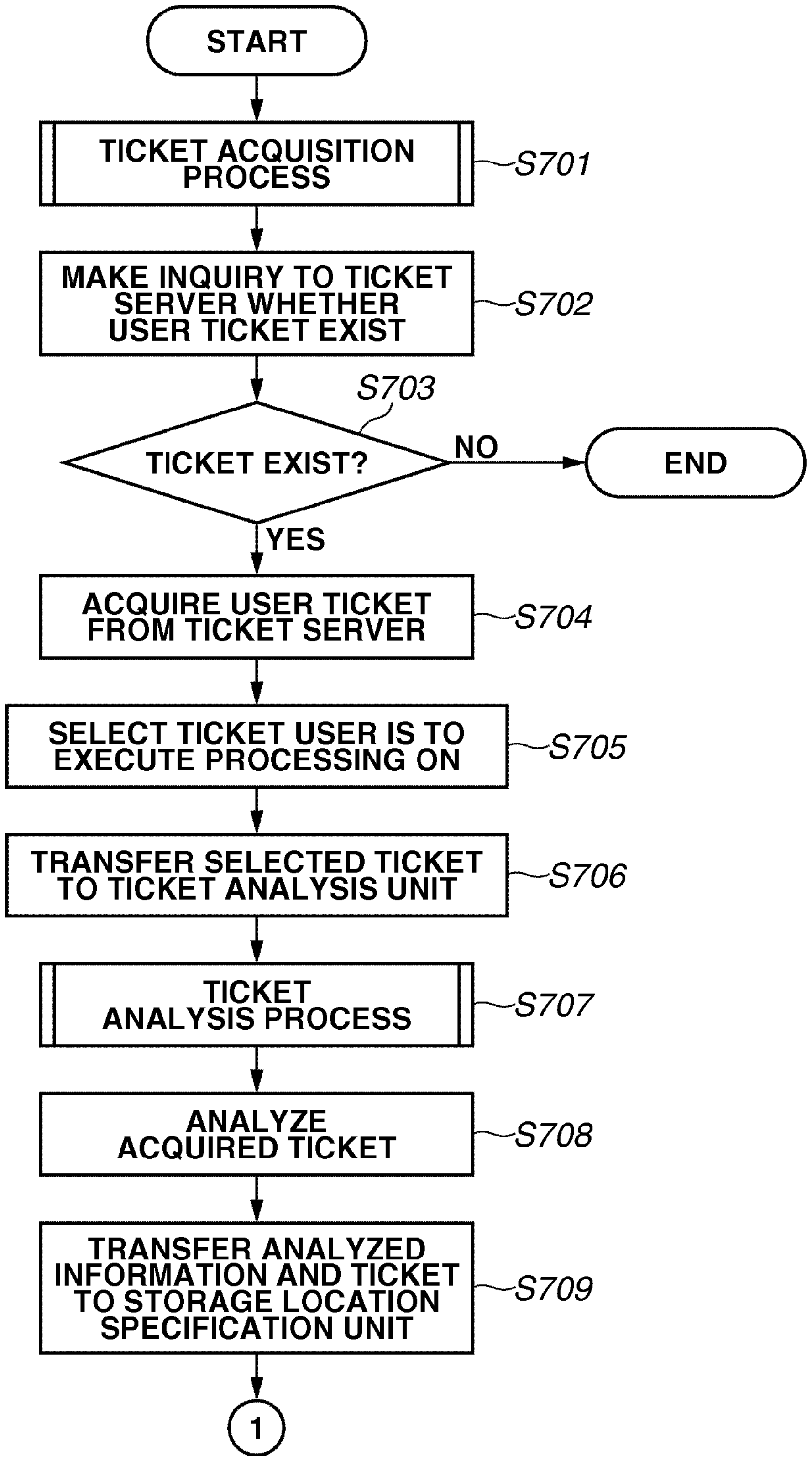
FIG. 5 is a flowchart illustrating a processing flow in a scan data transmission processing unit of the image processing apparatus.

As illustrated in FIG. 5, when the user logs in the image processing apparatus 101, in step S701, the processing proceeds to a ticket acquisition process. In the ticket acquisition process, first, in step S702, the ticket acquisition unit 211 makes an inquiry to the ticket server 102 whether the scan ticket 103 of the logged in user exists, and receives a response from the ticket server 102.

Next, in step S703, the ticket acquisition unit 211 determines whether the scan ticket 103 of the user exists in the ticket server 102 based on the response received from the ticket server 102. If the scan ticket 103 exists (YES in step S703), in step S704, the ticket acquisition unit 211 acquires the scan ticket 103 of the user from the ticket server 102. If the scan ticket 103 does not exist (NO in step S703), the processing terminates. For example, when the name of the ticket server 102 is DB, and the scan ticket of the user is stored in Yamada folder, the scan ticket in the DB/Yamada folder is acquired.

In step S705, the ticket acquisition unit 211 selects the scan ticket 103 on which the user will execute processing from among the acquired scan tickets 103. For this selection, the ticket acquisition unit 211 displays the ticket names of the acquired scan tickets 103 on an operation unit (not illustrated) of the image processing apparatus 101, and receives the scan ticket 103 selection made by the user. Next, in step S706, the ticket acquisition unit 211 transfers the selected scan ticket 103 to the ticket analysis unit 212.

In step S707, the processing proceeds to a ticket analysis process. In the ticket analysis process, in step S708, the ticket analysis unit 212 analyzes the acquired scan ticket 103. In the scan ticket 103, the scan setting information and the transmission destination information are described. After analysis of the scan ticket 103, in step S709, the ticket analysis unit 212 transfers the scan ticket 103 and the analyzed information to the storage location specification unit 213.

Figure 6:
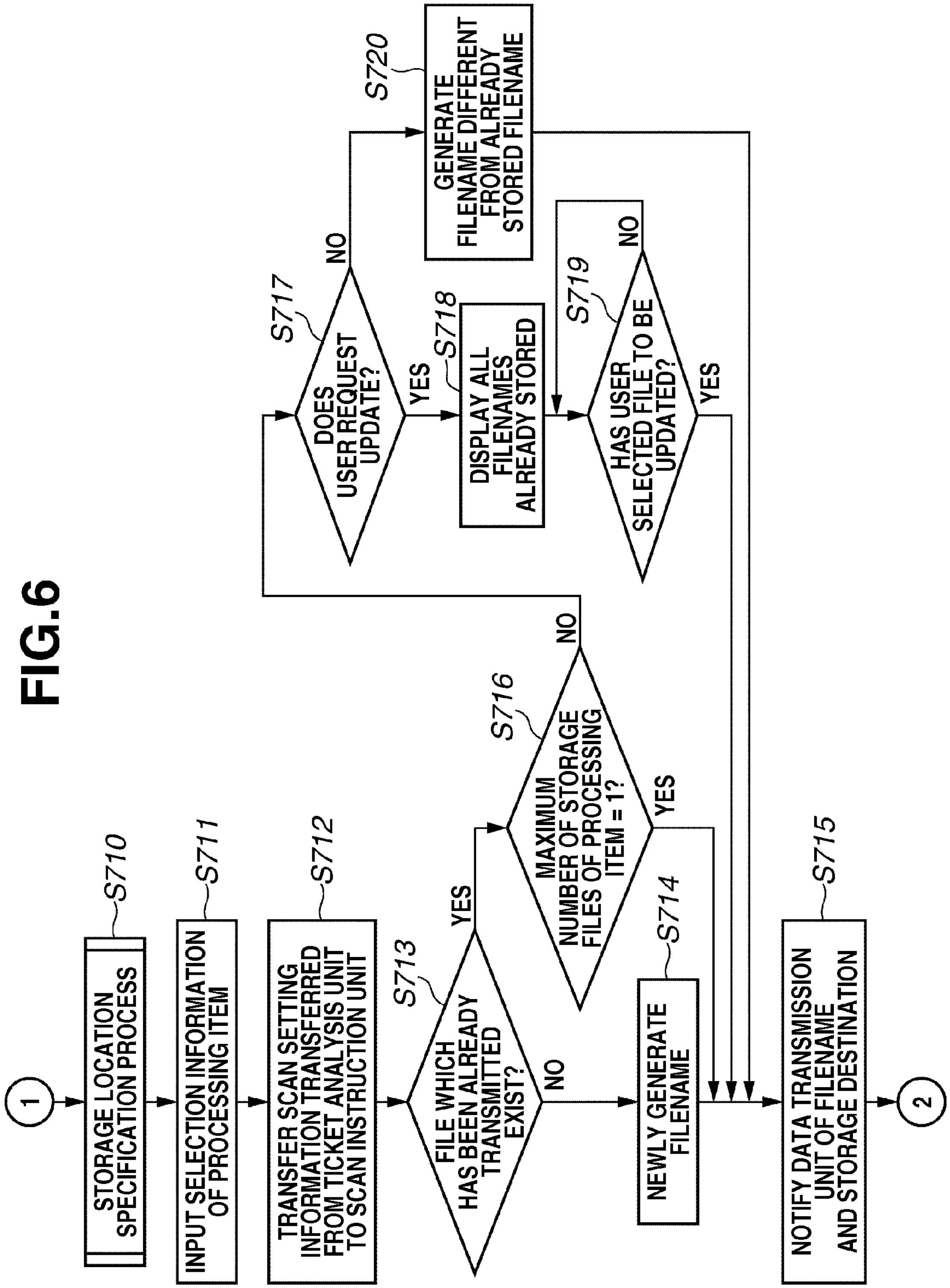
FIG. 6 is a flowchart illustrating a processing flow in the scan data transmission processing unit of the image processing apparatus.

Then, as illustrated in FIG. 6, in step S710, the processing proceeds to a storage location specification process. First, in step S711, the item names contained in the scan ticket 103 are displayed, and the user selects the item whose data is to be processed. These displayed processing items are either the accommodation expense or the transportation expense described in the item elements 307 and 308 of FIG. 3A. When the user selects the item whose data is to be processed, in step S711, information about the selected item name is input into the storage location specification unit 213.

Next, in step S712, the storage location specification unit 213 transfers the scan setting information transferred from the ticket analysis unit 212 to the scan instruction unit 214. Further, in step S713, the storage location specification unit 213 checks whether there is a description about a file which has been already transmitted in the processing item (accommodation expense or transportation expense) selected by the user in the scan ticket 103.

If there is no description about the file which has been already transmitted (NO in step S713), then in step S714, the storage location specification unit 213 newly generates a filename. Next, in step S715, the storage location specification unit 213 sets the generated filename as the filename, and notifies the data transmission unit 215 of that filename and the storage location 309.

On the other hand, if there is the description about the file which has been already transmitted in the processing item (YES in step S713), then in step S716, the storage location specification unit 213 checks described maximum number of storage files. The maximum number of storage files is a value of the data_max described in the item elements 307 and 308 in FIG. 3A. If the maximum number of storage files is one (YES in step S716), the filename is set as the already described filename, and in step S715, the data transmission unit 215 is notified of the filename and storage location 309. In this case, the already transmitted file is updated. On the other hand, if the maximum number of storage files is not one (NO in step S716), in step S717, the storage location specification unit 213 makes an inquiry to the user whether to request an update via the operation unit (not-illustrated).

If the user requests the update (YES in step S717), in step S718, the storage location specification unit 213 displays all of the filenames already stored in the processing items which are described in the scan ticket 103. Therefore, all of the file information of the processing items which are to be editing target by the data transmission processing is displayed.

Next, in step S719, the storage location specification unit 213 determines whether the user has selected the file to be updated using the operation unit. If the user has selected the file to be updated (YES in step S719), in step S715, the storage location specification unit 213 sets the filename selected by the user as the filename, and notifies the data transmission unit 215 of the filename and the storage location 309. If the user has not selected the file to be updated (NO in step S719), the storage location specification unit 213 waits for selection of the file to be updated by the user.

If it is determined in step S717 that the user requests a new addition (NO in step S717), in step S720, the storage location specification unit 213 generates a filename which is different from the already stored filenames. Then, in step S715, the storage location specification unit 213 notifies the data transmission unit 215 of the generated filename and the storage location 309.

Figure 7:
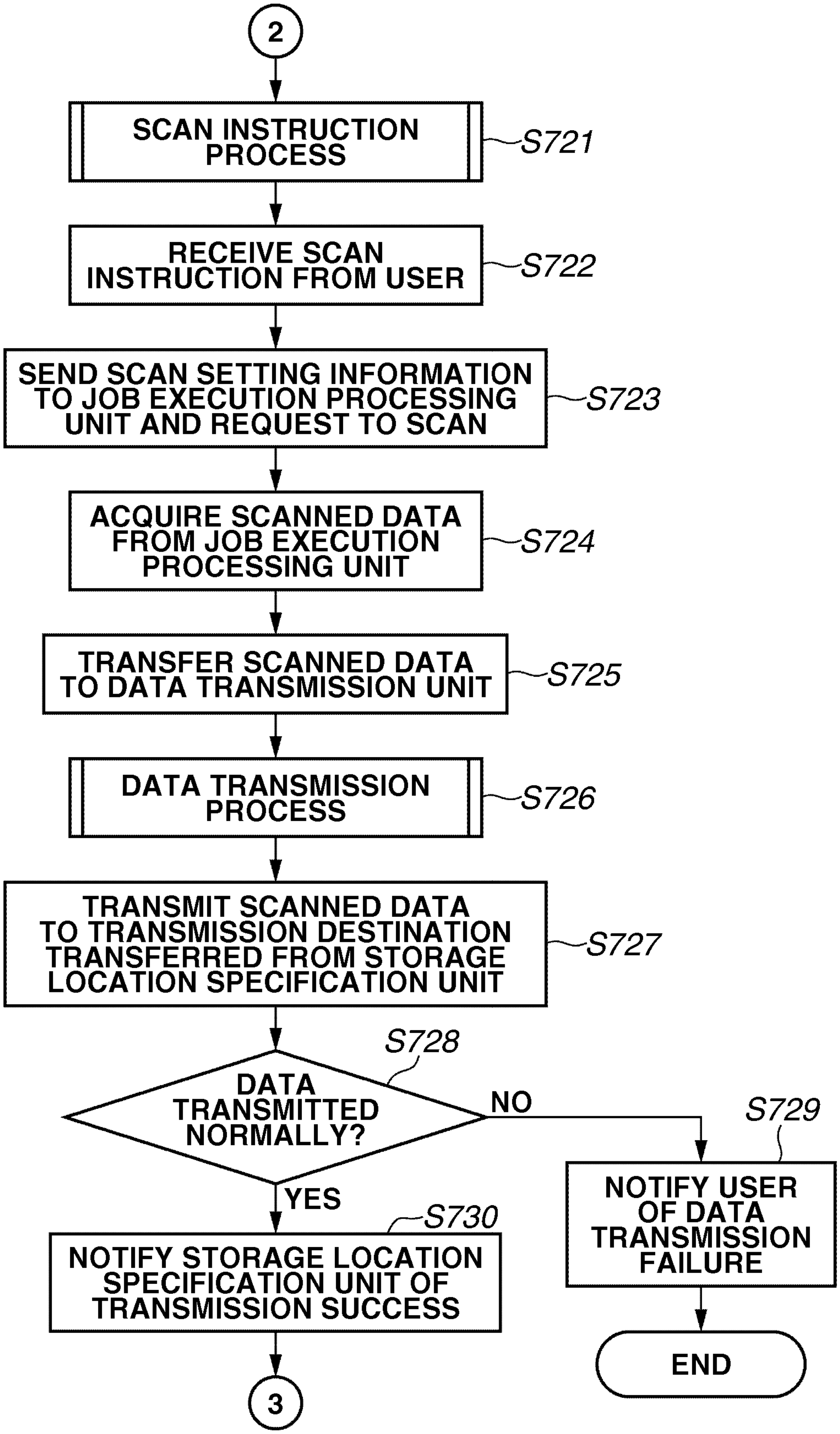
FIG. 7 is a flowchart illustrating a processing flow in the scan data transmission processing unit of the image processing apparatus.

Next, as illustrated in FIG. 7, in step S721, the processing proceeds to a scan instruction process. In the scan instruction process, first, in step S722, if there is a scan instruction from the user, the scan instruction unit 214 receives the scan instruction.

Next, in step S723, the scan instruction unit 214 sends the scan setting information 303 to the job execution processing unit 202 and requests the job execution processing unit 202 to perform scanning. The job execution processing unit 202 reads information recorded on the paper medium based on the scan setting information 303, and generates the scan data 105. Then, in step S724, the scan instruction unit 214 acquires the scan data 105 from the job execution processing unit 202. Next, in step S725, the scan instruction unit 214 transfers the scan data 105 to the data transmission unit 215.

Then, in step S726, the processing proceeds to a data transmission process. In the data transmission process, first, in step S727, the data transmission unit 215 transfers the scan data 105 received from the scan instruction unit 214 to the transmission destination 104 (storage location 309) transferred from the storage location specification unit 213.

Next, in step S728, the data transmission unit 215 determines whether the scan data 105 is transmitted normally. If the scan data 105 is not transmitted normally (NO in step S728), in step S729, the data transmission unit 215 notifies the user via the operation unit of the failure to transmit the scan data 105, and terminates the processing. On the other hand, if the scan data 105 is transmitted normally (YES in step S728), in step S730, the data transmission unit 215 notifies the storage location specification unit 213 of the success in transmitting the scan data 105.

Figure 8:
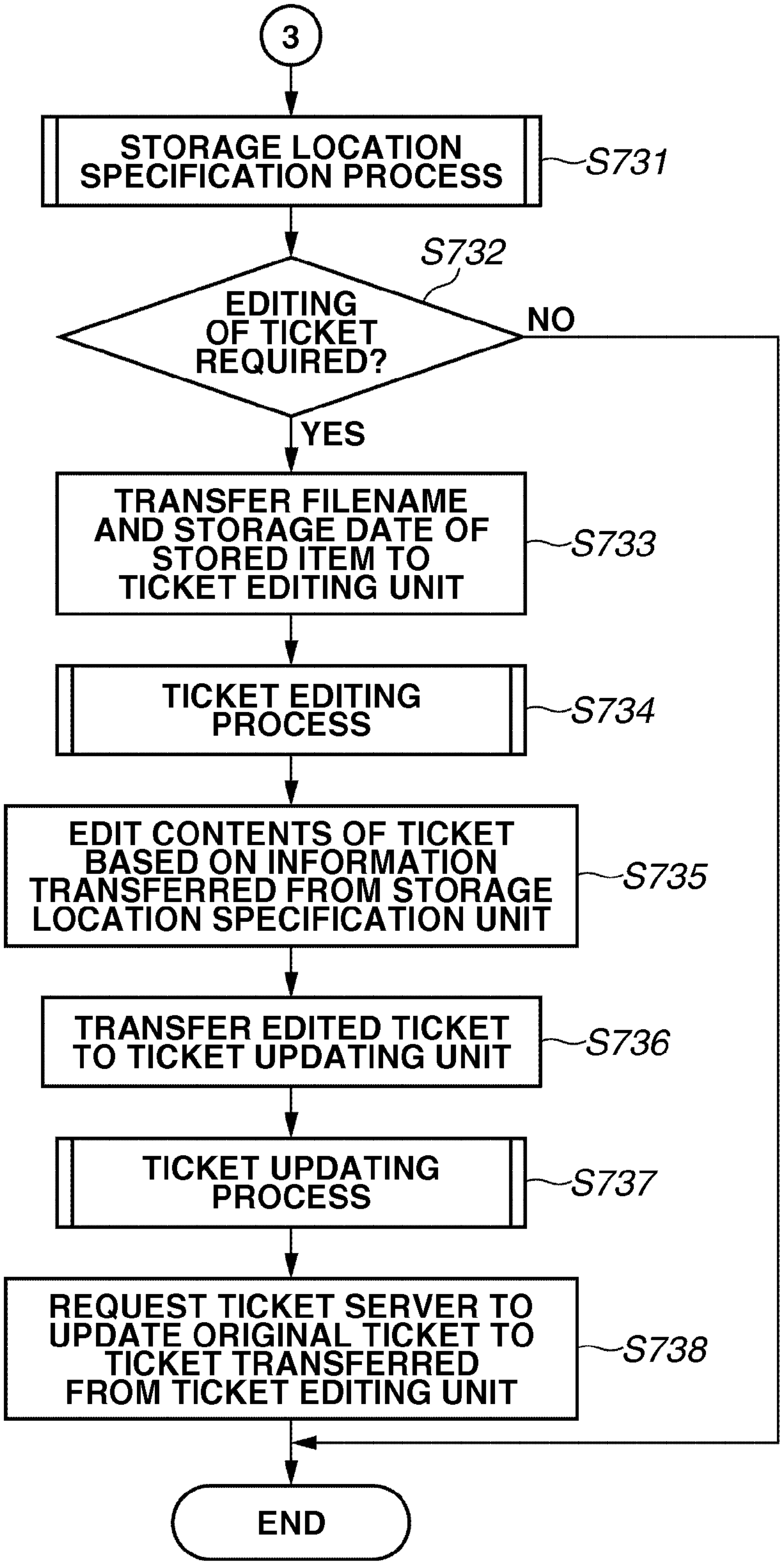
FIG. 8 is a flowchart illustrating a processing flow in the scan data transmission processing unit of the image processing apparatus.

Next, as illustrated in FIG. 8, in step S731, the processing proceeds to a storage location specification process. In the storage location specification process, first, in step S732, the storage location specification unit 213 determines whether editing of the scan ticket 103 is required. If editing of the scan ticket 103 is not required (NO in step S732), the processing terminates. On the other hand, if editing of the scan ticket 103 is required (YES in step S732), in step S733, the storage location specification unit 213 transfers the filename and storage date of the stored item, and the original scan ticket 103 to the ticket editing unit 216.

In step S734, the processing proceeds to a ticket editing process. In the ticket editing process, first, in step S735, the ticket editing unit 216 edits the contents of the scan ticket 103 based on the information transferred from the storage location specification unit 213. More specifically, the ticket editing unit 216 updates the contents of the original scan ticket 103 using the filename and storage date of the stored item. Next, in step S736, the ticket editing unit 216 transfers the edited scan ticket 106 to the ticket updating unit 217.

Then, in step S737, the processing proceeds to a ticket updating process. In the ticket updating process, in step S738, the ticket updating unit 217 transmits the edited scan ticket

106 transferred from the ticket editing unit 216 to the ticket server 102, and requests the ticket server 102 to update the original scan ticket 103. Then, the processing terminates.

A second exemplary embodiment of the present invention will be described. In the first exemplary embodiment, the storage location and transmitted date of the transmitted data are described as an example of information added to the scan ticket. However, some other piece of information, such as a current processing state may be described in the scan ticket and a person who performs processing may be changed based on the processing state. Therefore, in the second exemplary embodiment, a case is described in which the current processing state is described in the scan ticket. The second exemplary embodiment will be described with reference to FIGS. 9 and 10. Parts of the second exemplary embodiment which are similar to the first exemplary embodiment will not be described.

FIG. 9A illustrates an example of the scan ticket in which a current processing state is additionally described in the scan ticket acquired from the ticket server 102 illustrated in FIG. 4B. In a text portion of a mode element 801, the current processing person is described. In FIG. 9A, the term "settlement processing person" represents that the settlement processing person is performing the processing. Further, in an approverID attribute of the mode element, an ID (10988) for identifying an approver who is the next processing person is described.

The identification ID described in the approverID attribute of the mode element may be any piece of information as long as it can specify the next processing person. For example, a user ID, an employee number and the like can be used. When the user finished his/her own processing and wishes to pass the processing onto the next processing person, the scan ticket is automatically edited by selecting the next processing person. As a result, the scan ticket comes to be a ticket of the approver who matches the approver ID attribute.

The scan ticket can be acquired when the approver matching the approverID of the mode element requests acquisition of the scan ticket. Then, the approver determines whether to approve the scan ticket by acquiring the data described in the contents 306. If the data is approved, the scan ticket disappears. On the other hand, if the data is rejected, the approverID of the mode element is again changed to the settlement processing person, and the processing returns to the settlement processing person. At this stage, a comment describing a reason why the data is rejected may be additionally described in the scan ticket, and the contents of such comment may be displayed when the settlement processing person acquires the scan ticket.

FIG. 9B is an example of the scan ticket when the processing is rejected. In FIG. 9B, information on the last processing person (person who performed the processing last) and the next processing person is changed from the scan ticket illustrated in FIG. 9A. More specifically, in the text portion of a mode element 901, the identification ID of the approver who is the last processing person is described. In the approverID attribute, the identification ID of the settlement processing person is described. Further, a comment 902 from the approver describing the reason why the data is rejected may be additionally described in the ticket, and the contents of the comment may be displayed when the settlement processing person acquires the scan ticket.

Figure 10:
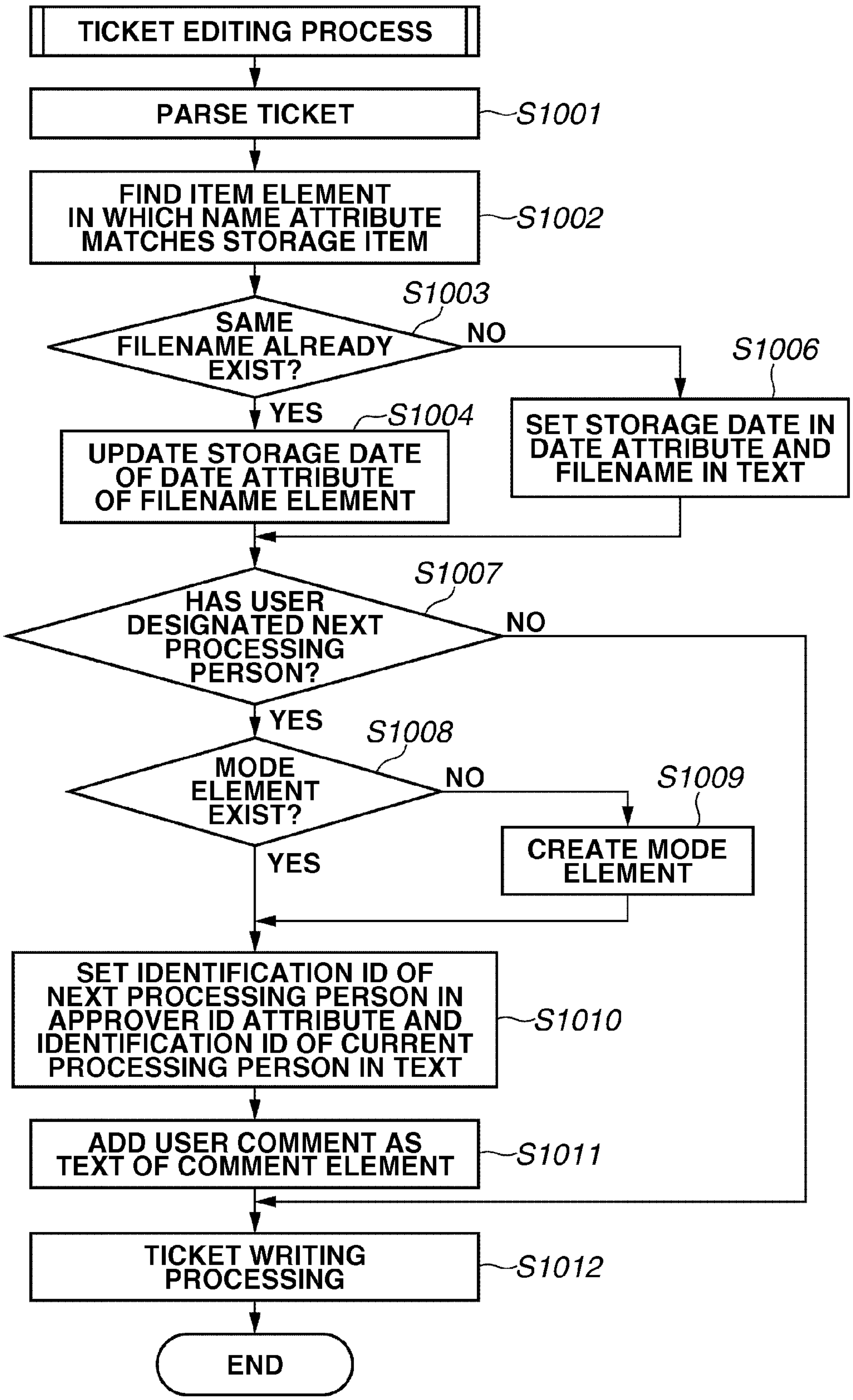
FIG. 10 is a flowchart illustrating a processing flow in a ticket editing unit of the image processing apparatus.

Finally, the ticket editing process will be described in more detail using FIGS. 3, 4, and 8 to 10. FIG. 10 is a flowchart of the processing in the ticket editing unit 216 of the image processing apparatus 101.

It is assumed that the user acquires the scan ticket of FIG. 3A and newly scans and transmits accommodation expense data. Namely, processing of the accommodation expense is selected from among the processing of the accommodation expense and the transportation expense. In this case, in step S733 in FIG. 8, the scan ticket of FIG. 3A, the scanned item name "accommodation expense", the filename "accommodation expense.jpg", and the storage date "2007/5/12" are transferred to the ticket editing unit 216 by the storage location specification unit 213.

First, in step S1001 in FIG. 10, the ticket editing unit 216 parses the transferred ticket of FIG. 3A. In step S1002, the ticket editing unit 216 finds the item element 307 in which the name attribute is "accommodation expense". Next, in step S1003, the ticket editing unit 216 checks whether a filename element having the same filename as "accommodation expense. jpg" already exists in the item element. Since such a filename element does not exist in FIG. 3A (NO in step S1003), in step S1006, the storage date "2007/5/12" is set in the date attribute and the filename "accommodation expense.jpg" is set in the text. As a result, the items of the description 401 are set as information.

Next, in step S1007, it is determined whether the user has designated the next processing person. If the user has not designated the next processing person (NO in step S1007), in step S1012, the ticket editing unit 216 performs ticket writing processing, and the processing proceeds to step S736. In step S736, the edited ticket of FIG. 3B is transferred to the ticket updating unit 217.

Next, a case will be considered in which the user acquires the scan ticket of FIG. 4A, and updates, additionally scans, and transmits the transportation expense data. In this case, "transportation expense" is selected. Further, "transportation expense 0002.jpg" is selected as the file to be updated, and "transportation expense 0003.jpg" is generated as the filename of the file to be added. In step S733, the scan ticket of FIG. 4A, the scanned item name "transportation expense", the filename "transportation expense 0002.jpg", the filename "transportation expense 0003.jpg", and the storage date "2007/5/16" are transferred to the ticket editing unit 216 by the storage location specification unit 213.

In step S1001, the ticket editing unit 216 parses the transferred ticket of FIG. 4A. In step S1002, the ticket editing unit 216 finds out the item element 308 in which the name attribute is "transportation expense". Next, in step S1003, the ticket editing unit 216 checks whether a filename element having the same filename as "transportation expense 0002.jpg" or "transportation expense 0003.jpg" already exists in the item element. In FIG. 4A, the filename element 502 of "transportation expense 0002.jpg" exists (YES in step S1003). Therefore, in step S1004, the storage date of the date attribute of the filename element 502 is updated to "2007/5/16". On the other hand, since "transportation expense 0003.jpg" does not exist (NO in step S1003), in step S1006, the storage date "2007/5/16" is set to the date attribute and the filename "transportation expense 0003.jpg" is set in the text. As a result, as illustrated in FIG. 4B, the items of the filename elements 601 and 602 are set as information.

In step S1007, it is determined whether the user has designated the next processing person. If the user has not designated the next processing person (NO in step S1007), in step S1012, the ticket editing unit 216 performs ticket writing processing, and the processing proceeds to step S736. In step S736, the edited ticket of FIG. 5B is transferred to the ticket updating unit 217.

Next, a case will be considered in which the user finishes his/her own processing, and transfers the processing onto the next processing person. In this case, in the ticket editing unit 216, the next processing person has been designated by the user (YES in step S1007). Here, the description of the ticket editing for adding and updating the filename of the scanned data is omitted. The user designates the ID (10988) of the approver, who is the next processing person (YES in step S1007), and the processing proceeds to step S1008. In the case of FIGS. 3B and 4A, since a mode element does not exist (NO in step S1008), in step S1009, the mode element is created. In step S1010, the identification ID of the next processing person is set in the approverID attribute, and the identification ID of the current user (settlement processing person), who is the last processing person, is set in the text element. Further, if a user comment exists, in step S1011, the information about the comment is added. In the current case, there is no user comment. As a result, the mode element 801 item is set as the information. Finally, in step S1012, the ticket editing unit 216 performs ticket writing processing, and the processing proceeds to step S736. In step S736, the edited ticket of FIG. 9A is transferred to the ticket updating unit 217.

Further, if the approver to whom the scan ticket of FIG. 9A has been transferred rejects approval, based on a similar flow, the processing returns to the settlement processing person. From among the scan tickets in the folder of the settlement processing person, the approver can acquire the scan ticket in which the approverID matches his/her own ID. In this case, the user designates the ID (10000) of the settlement processing person, who is the previous processing person (YES in step S1007). In the case of FIG. 9A, since a mode element exists (YES in step S1008), in step S1010, the identification ID of the settlement processing person, who is the previous processing person, is set in the approverID attribute, and the identification ID of the current user (approver), who is the last processing person, is set in the text element. Then, in step S1011, the user comment is added. As a result, the mode element 901 and the comment 902 items are set as information. Finally, in step S1012, the ticket editing unit 216 performs ticket writing processing, and the processing proceeds to step S736. In step S736, the edited ticket of FIG. 9B is transferred to the ticket updating unit 217.

In the second exemplary embodiment, while a case was described in which only the current processing state is additionally described, relevance with the previous processing or subsequent processing may be described so that it can be seen which processing is next performed based on the current state. More specifically, the relevance between the transmission processing (addition, updating processing and the like) of the present data and the processing (approving processing and the like) to be performed on that data after such transmission processing may be described.

The first exemplary embodiment of the present invention is configured so that a scan ticket including data transmission destination information is edited using the filename and transmission date of the transmitted data. Therefore, the data storage state in the transmission destination can be comprehended based on the scan ticket without making an inquiry to the transmission destination about the data storage state.

Further, the second exemplary embodiment is configured to change the user who can acquire the scan ticket. Therefore, for example, after the data is transmitted to the transmission destination, by changing an acquisition right of the scan ticket from the transmitter of the data to the approver of the data, processing of the wrong data can be prevented from proceeding in the state as transmitted by the data transmitter.

Further, the second exemplary embodiment is configured so that the relevance between the transmission processing of the present data and the processing to be performed on that data after such transmission processing can be comprehended. Therefore, a part of the jobs can be prevented from disappearing without being processed, until all of the relevant processing is completed.

Each of the units and steps constituting the above-described exemplary embodiments of the present invention may be realized by an operation of a program stored in a random access memory (RAM), read only memory (ROM) and the like of a computer. Such a program, and a computer-readable recording medium on which the program is recorded, are also included in the present invention.

Further, the present invention may also be realized as a system, an apparatus, a method, a program, a recording medium and the like. More specifically, the present invention can be applied in an apparatus formed from a single device.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-175008 filed Jul. 3, 2008, which is hereby incorporated by reference herein in its entirety.

What is claimed is:

1. A data transmission apparatus which transmits data comprising:

an acquisition unit configured to acquire information including a transmission destination of the data from an information providing apparatus on a network;

a transmission unit configured to transmit the data to the transmission destination based on the information acquired by the acquisition unit;

an editing unit configured to edit the information acquired from the information providing apparatus, prior to transmitting data to the transmission destination, by adding to the information, a description on the data to be transmitted; and a request unit configured to request the information providing apparatus to update the information to the edited information.

2. The data transmission apparatus according to claim 1, wherein the editing unit edits the information so that an identifier of the data transmitted by the transmission unit is added to the information.

3. The data transmission apparatus according to claim 1, wherein the editing unit edits the information so that a date on which the data was transmitted by the transmission unit is added to the information.

4. The data transmission apparatus according to claim 1, wherein the editing unit edits designation information for designating the transmission destination which is provided with the information.

5. The data transmission apparatus according to claim 1, wherein the information includes information indicating a category of the data to be transmitted, and wherein the editing unit edits the information so that an identifier of the transmitted data corresponding to the category to which the transmitted data belongs is added.

6. The data transmission apparatus according to claim 1, wherein the transmission unit reads an original based on a condition included in the information acquired from the information providing apparatus, and transmit the obtained original data to the transmission destination.

7. A method for controlling transmission by a data transmission apparatus which transmits data, the method comprising:

acquiring information including a transmission destination of the data from an information providing apparatus on a network;

transmitting the data to the transmission destination based on the acquired information;

editing the information acquired from the information providing apparatus, prior to transmitting data to the transmission destination, by adding to the information, a description on the data to be transmitted; and requesting the information providing apparatus to update the information to the edited information.

8. The method according to claim 7, further comprising editing the information so that an identifier of the transmitted data is added to the information.

9. The method according to claim 7, further comprising editing the information so that a date on which the data was transmitted is added to the information.

10. The method according to claim 7, further comprising editing the information designating the transmission destination which is provided with the information.

11. The method according to claim 7, wherein the information includes information indicating a category of the data to be transmitted, and further comprising editing the information so that an identifier of the transmitted data corresponding to the category to which the transmitted data belongs is added.

12. The method according to claim 7, further comprising reading an original based on a condition included in the information acquired from the information providing apparatus, and transmitting the obtained original data to the transmission destination.

13. A non-transitory storage medium on which a computer program for transmitting data is stored, the program comprising:

acquiring information including a transmission destination of the data from an information providing apparatus on a network;

transmitting the data to the transmission destination based on the acquired information;

editing the information acquired from the information providing apparatus, prior to transmitting data to the transmission destination, by adding to the information, a description on the data to be transmitted; and requesting the information providing apparatus to update the information to the edited information.

14. The non-transitory storage medium according to claim 13, wherein the program further comprises editing the information so that an identifier of the transmitted data is added to the information.

15. The non-transitory storage medium according to claim 13, wherein the program further comprises editing the information so that a date on which the data was transmitted is added to the information.

16. The non-transitory storage medium according to claim 13, wherein the program further comprises editing designation information for designating the transmission destination which is provided with the information.

17. The non-transitory storage medium according to claim 13, wherein the information includes information indicating a category of the data to be transmitted, and wherein the program further comprises editing the information so that an identifier of the transmitted data corresponding to the category to which the transmitted data belongs is added.

18. The non-transitory storage medium according to claim 13, wherein the program further comprises reading an original based on a condition included in the information acquired from the information providing apparatus, and transmitting the obtained original data to the transmission destination.

* * * * *